United States Patent [19]
Voss et al.

[11] Patent Number: 5,454,606
[45] Date of Patent: Oct. 3, 1995

[54] V-RETAINER COUPLING ASSEMBLY CONSTRUCTION WHICH PREVENTS INCORRECT INSTALLATION WITH REDUCED WIDTH SLOT

[75] Inventors: William J. Voss, Lakewood; Nicola Antonelli, North Royalton, both of Ohio

[73] Assignee: Voss Industries, Inc., Cleveland, Ohio

[21] Appl. No.: 246,107

[22] Filed: May 19, 1994

Related U.S. Application Data

[63] Continuation-in-part of Ser. No. 183,112, Jan. 18, 1994, abandoned, which is a continuation of Ser. No. 13,587, Feb. 4, 1993, abandoned.

[51] Int. Cl.⁶ .................................................. F16L 23/00
[52] U.S. Cl. ........................ 285/367; 285/410; 285/420; 24/279; 292/256.75
[58] Field of Search ............................. 24/279, 280, 281, 24/282, 283, 284, 285; 285/420, 421, 410, 411, 409, 367, 252, 253; 292/256.75, 256.73, 256.69, 66, 113, DIG. 79

[56] References Cited

U.S. PATENT DOCUMENTS

| | | |
|---|---|---|
| 2,653,836 | 9/1953 | Christophersen et al. |
| 2,688,170 | 9/1954 | Balzer . |
| 2,775,806 | 1/1957 | Love . |
| 2,837,383 | 6/1958 | Skelly . |
| 2,934,805 | 5/1960 | Zartler . |
| 3,396,440 | 8/1968 | Van Schendelen . |
| 3,575,432 | 4/1971 | Taylor . |
| 3,600,770 | 8/1971 | Halling ................... 285/411 |
| 3,797,078 | 3/1974 | LaPointe . |
| 3,797,079 | 3/1974 | Nixon ..................... 285/411 |
| 3,797,836 | 3/1974 | Halling . |
| 4,681,353 | 7/1987 | Halling . |
| 4,739,542 | 4/1988 | Krzesicki . |
| 4,919,453 | 4/1990 | Halling ...................... 285/3 |

FOREIGN PATENT DOCUMENTS

| | | |
|---|---|---|
| 0042168A1 | 6/1981 | European Pat. Off. . |
| 3130112A1 | 2/1983 | Germany . |
| 1104922 | 3/1968 | United Kingdom . |
| 1140636 | 1/1969 | United Kingdom . |
| 1472750 | 5/1977 | United Kingdom . |

OTHER PUBLICATIONS

AVICA Publication entitled "V–Flange duct joints".
Voss Aerospace Engineering Bulletin No. EB100.
Society of Automotive Engineers, Inc. 1992—Bulletin AS1895/21 (4 pages).
EG&G Pressure Science Inc.—Engineer's Data Book 1988 Drawing No. 30335–1 and FIG. 2: Baulk Tab Preventing Improper Assembly.

*Primary Examiner*—Eric K. Nicholson
*Attorney, Agent, or Firm*—Fay, Sharpe, Beall, Fagan, Minnich & McKee

[57] ABSTRACT

A coupling assembly includes a first coupling element having first and second ends and a second coupling element having first and second ends. A first structure secures the first end of the first coupling element to the first end of the second coupling element. A second structure secures the second end of the first coupling element to the second end of the second coupling element. The second structure includes a latch pivotally and slidably mounted on the second end of the first coupling element and an eyebolt pivotally secured to the first coupling element second end. A nut is selectively threadable onto a threaded end of the eyebolt. A construction is provided which prevents an incorrect installation of the second end of the second coupling element in relation to the latch. The construction can take several forms including a reduced width slot on the latch or protrusions extending into the slot from at least one of the sides of the slot toward the other side thereof. In conjunction with a suitably sized eyebolt, these constructions prevent enough travel of the latch as to allow for an incorrect fastening in which the second end of the second coupling element is positioned around the eyebolt but outside the latch when the nut is threaded onto the eyebolt.

22 Claims, 3 Drawing Sheets

V-RETAINER COUPLING ASSEMBLY CONSTRUCTION WHICH PREVENTS INCORRECT INSTALLATION WITH REDUCED WIDTH SLOT

BACKGROUND OF THE INVENTION

This application is a continuation-in-part of patent application Ser. No. 08/183,112 filed on Jan. 18, 1994 and now abandoned. That application, in turn, is a continuation of application Ser. No. 08/013,587 filed on Feb. 4, 1993 and now abandoned.

This invention generally relates to circumferentially contractible clamps. More particularly, the invention relates to circular clamps employing nut and bolt arrangements which are tightened around the flanged ends of a pair of tubes or ducts to join such members together.

More specifically, the present invention relates to a rigid V-retainer coupling assembly which is used, for example, on aircraft jet engine bleed air ducting. However, it should be appreciated that the inventive coupling disclosed herein can also be used to secure ducting components on air power units and for mounting such accessories as fuel pumps, generators, starters and flow controls, as well as for uses outside of the aerospace industry.

Circumferentially contractible clamps are widely used to clamp conduits and the like. Such clamps may be used to mount a hose upon an end fitting, position and clamp a patch upon a conduit, clamp the ends of aligned conduits in a sealed relationship, or used in similar applications. Such contractible clamps usually include a band or strap adapted to encircle the object or objects to be clamped, or the band may consist of a plurality of interconnected segments. The ends of the band are provided with an actuator capable of drawing the ends towards each other. Such an actuator often takes the form of a bolt and nut device. In a contractible clamp using a bolt and nut actuator, the bolt is usually pivotally mounted to one end of the band, while a nut is selectively mounted on the bolt and bears against the other end of the band. As the nut is tightened on the bolt, the clamp ends are drawn together reducing the clamp circumference and resulting in the desired clamp constriction.

In order to insure that the clamp will not fail if the bolt fails, certain contractible clamps are provided with a safety means which will retain the clamp around the parts to be joined. The safety means can comprise a link which is hinged to the lug bearing the bolt and is adapted to extend over the corresponding lug when the clamp is bolted up. If there is a failure of the associated bolt, the link will retain the two lugs and keep the clamp around the parts to be joined to an extent sufficient to prevent the parts that are joined from separating completely. The link can be U-shaped with the base thereof being provided with a hole through which in use the free end of the hinged bolt passes. Each of the arms of the link is provided with a longitudinal slot so that a pin extending through the lug to which the link is secured can extend through the link slot, the arrangement being such that the link is prevented from falling off the lug once it has been secured in place. Such contractible clamps, termed rigid V-retainer couplings, are known in the art.

One of the problems with conventional V-retainer coupling assemblies has been that incorrect installation of the assembly is possible. Such an incorrect installation is illustrated in FIG. 4 of the instant application's drawings. It can be seen there that it is possible to so slide the safety latch in relation to the eyebolt lug of the clamp as to allow the trunnion lug to be incorrectly placed on the outside of the safety latch. Thereupon, the self-locking nut can be secured in place on the threaded portion of the eyebolt making it appear superficially as if the latch has been correctly installed. However, the trunnion lug would be free to disengage from the nut and move away from the eyebolt under vibration loads and the like as are experienced during aircraft flight. Obviously, such disengagement will cause leakage at the joints of the two ducts which were meant to be coupled together and may result in catastrophic failure of the ducting assembly itself. If such ducting assembly is used in an aircraft jet engine environment such as on bleed air ducting, that failure may also result in engine shutdown with possible catastrophic consequences.

Accordingly, it has been considered desirable to develop a new and improved coupling assembly which would overcome the foregoing difficulties and others while providing better and more advantageous overall results.

BRIEF SUMMARY OF THE INVENTION

The present invention relates to a new and improved coupling assembly.

More specifically, the invention comprises a first coupling element having a first end and a second end and a second coupling element having a first end and a second end. A first means is provided for securing the first end of the first coupling element to the first end of the second coupling element. A second means is provided for securing the second end of the first coupling element to the second end of the second coupling element. The second means comprises a latch pivotally and slidably mounted on the second end of the first coupling element and an eyebolt pivotally mounted on the first element second end. A nut is selectively threadable onto a threaded end of the eyebolt. A means is provided for preventing an incorrect installation of the second end of the second coupling element in relation to the latch.

One embodiment of the means for preventing incorrect installation comprises a reduced width slot portion located on the latch. The reduced width slot portion prevents the latch from sliding enough in relation to the second end of the first coupling element to allow for an incorrect installation to occur. The reduced width slot portion can extend to one end of the slot. Alternatively, the reduced width slot portion can extend only along a section of the slot between the two ends thereof.

According to another embodiment of the present invention, a new and improved circumferentially contractible clamp is provided.

More particularly in accordance with this aspect of the invention, the clamp comprises a band adapted to encircle the object to be clamped. First and second ends are defined on the band. A pivot pin is pivotally mounted on the first end and an eyebolt is pivotally mounted on the pivot pin. A latch is slidably and pivotally mounted on the pivot pin. A nut is selectively threadable onto a threaded end of the eyebolt. A means is provided for preventing an incorrect installation of the second end of the band in relation to the latch.

One embodiment of the means for preventing incorrect installation comprises a reduced width slot portion located on the latch. The reduced width slot portion prevents the latch from sliding enough in relation to the pivot pin to allow for an incorrect installation to occur.

According to still another embodiment of the present invention, a method is provided for preventing an incorrect installation of a circumferentially contractible clamp.

More particularly in accordance with the method, a circumferentially contractible clamp is provided, the clamp comprising a band adapted to encircle the object to be clamped with the band having first and second ends. A pivot pin is pivotally mounted on the first end of the band and an eyebolt is pivotally mounted on the pivot pin. A latch is slidably and pivotally mounted on the pivot pin. A nut is selectively threadable onto the threaded end of the eyebolt. A sliding movement of the latch in relationship to the pivot pin is limited and a length of the eyebolt is controlled in order to prevent an incorrect installation of the second end of the band in relation to the latch.

One advantage of the present invention is the provision of a new and improved circumferentially contractible clamp.

Another advantage of the present invention is the provision of a new and improved coupling assembly for securing a pair of flanged ducts together.

Still another advantage of the present invention is the provision of a V-retainer coupling assembly having a means for preventing an incorrect installation of one end of a first coupling element in relation to a safety latch secured to an adjacent end of a second coupling element.

Yet another advantage of the present invention is the provision of a rigid V-retainer coupling assembly wherein a reduced width slot portion is provided on a safety latch. The reduced width slot portion, in cooperation with a suitable length eyebolt, prevents the latch from sliding enough in relation to the lug to which the latch is secured to allow for an incorrect installation to occur when manually installing the coupling assembly. However, a pin to which the eyebolt is secured can be forced into the reduced width slot portion of the latch when a tool is used by the installer. This enables the V-retainer coupling assembly to be employed over a least material condition flange pair even with a slight angular misalignment.

A further advantage of the present invention is the provision of a method for preventing an incorrect installation of a V-retainer coupling assembly.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, several embodiments of which will be described in detail in this specification and illustrated in the accompany drawings which form a part hereof and wherein:

FIG. 2 is a reduced size exploded perspective view of a joint utilizing another embodiment of a conventional rigid V-retainer coupling assembly;

DETAILED DESCRIPTION OF THE SEVERAL EMBODIMENTS

Figure 1:
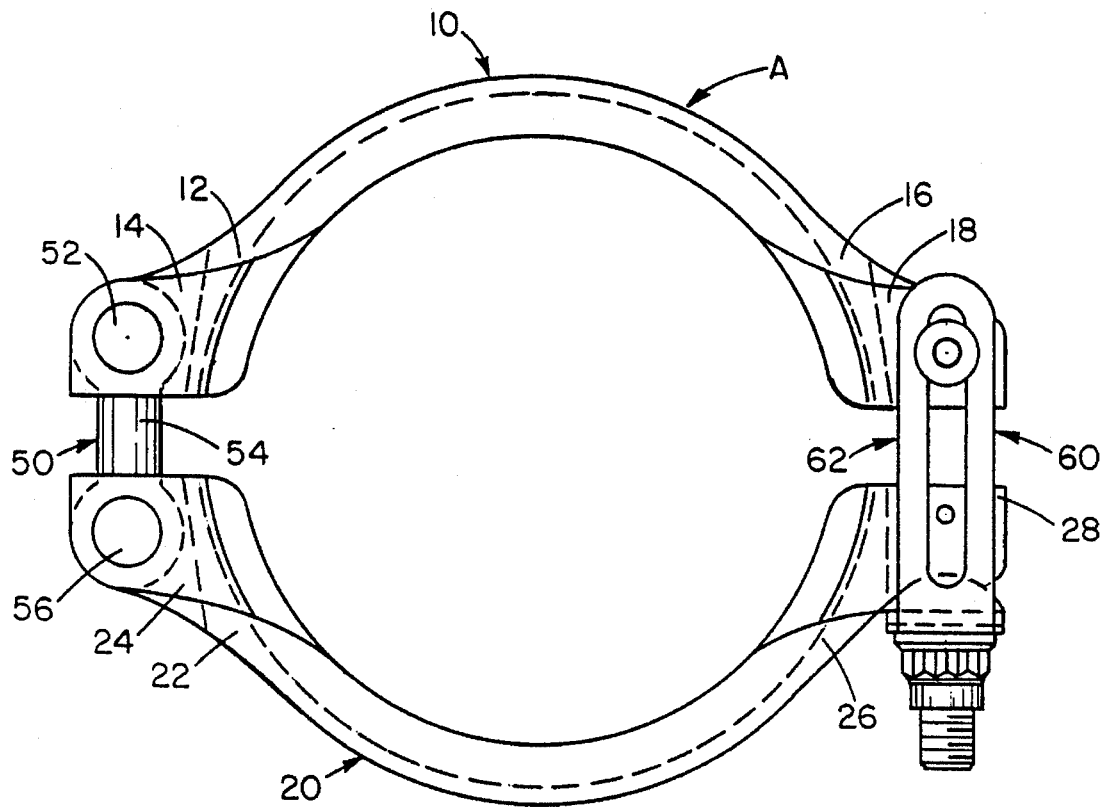
FIG. 1 is a side elevational view of a conventional rigid V-retainer coupling assembly.

Referring now to the drawings, wherein the showings are for purposes of illustrating several embodiments of the invention only and not for purposes of limiting same, FIG. 1 illustrates a conventional rigid V-retainer coupling assembly A and FIG. 2 illustrates another conventional rigid V-retainer coupling assembly B as used for securing a pair of flanged ducts together. While the coupling assembly is primarily designed for and will hereinafter be described in connection with a flanged joint used on aircraft jet engine bleed air ducting, it should be appreciated that the coupling assembly can also be used in various other aerospace and non-aerospace environments in which it is necessary to secure two tubular elements together. In addition, while the invention is disclosed as being used in connection with a rigid V-retainer coupling assembly, it should be appreciated that the invention could also be used on flexible coupling assemblies, clamps or bands.

With reference now to FIG. 1, a conventional rigid V-retainer coupling assembly A comprises a first retainer half 10 having a first end 12 terminating in a first end lug 14 and a second end 16 terminating in a second end lug 18. Also provided is a second retainer half 20 having a first end 22 on which is located a first end lug 24 and a second end 26 on which is located a second end lug or trunnion lug 28.

With reference now to FIG. 2, the retainer halves 10 and 20 are each somewhat V-shaped in cross section and include a V-shaped channel 30 defined by a pair of side walls connected by a base. The coupling half 10 is used to secure a first flange 32 of a first duct 34 to a second flange 36 of a second duct 38 so as to trap a seal 40 between the two flanges.

Referring now again to FIG. 1, a first means 50 in the form of a hinge link is provided for securing the first retainer first end lug 14 to the second retainer first end lug 24. The hinge link can comprise a first rivet 52 which secures one end of a plurality of metal plates 54 (only one of which is visible in FIG. 1) to the first lug 14 and a second rivet 56 which secures the other end of the plurality of metal plates 54 to the second lug 24. Located on the other end of the coupling assembly is a second means 60 for securing the second ends 18, 28 of the first and second retainer halves to each other. The second means 60 is shown as a conventional safety latch assembly.

While FIG. 1 illustrates only one safety latch assembly for securing the adjacent ends on one side of the V-retainer coupling A together, FIG. 2 illustrates a rigid V-retainer coupling B which has a pair of such conventional safety latch assemblies. In the embodiment illustrated in FIG. 2, the two safety latch assemblies of the rigid V-retainer coupling B both need to be tightened in order to secure the coupling B around the adjacent flanges 32 and 36. It should also be appreciated that one could provide a rigid V-retainer coupling having more than the two sections illustrated in FIGS.

1 and 2. In other words, it would be conceivable to have a flexible or rigid V-retainer coupling made up of three or more sections which are pivotally joined to each other except at one end where a safety latch assembly is located, if that is considered necessary for a particular environment.

Figure 4:
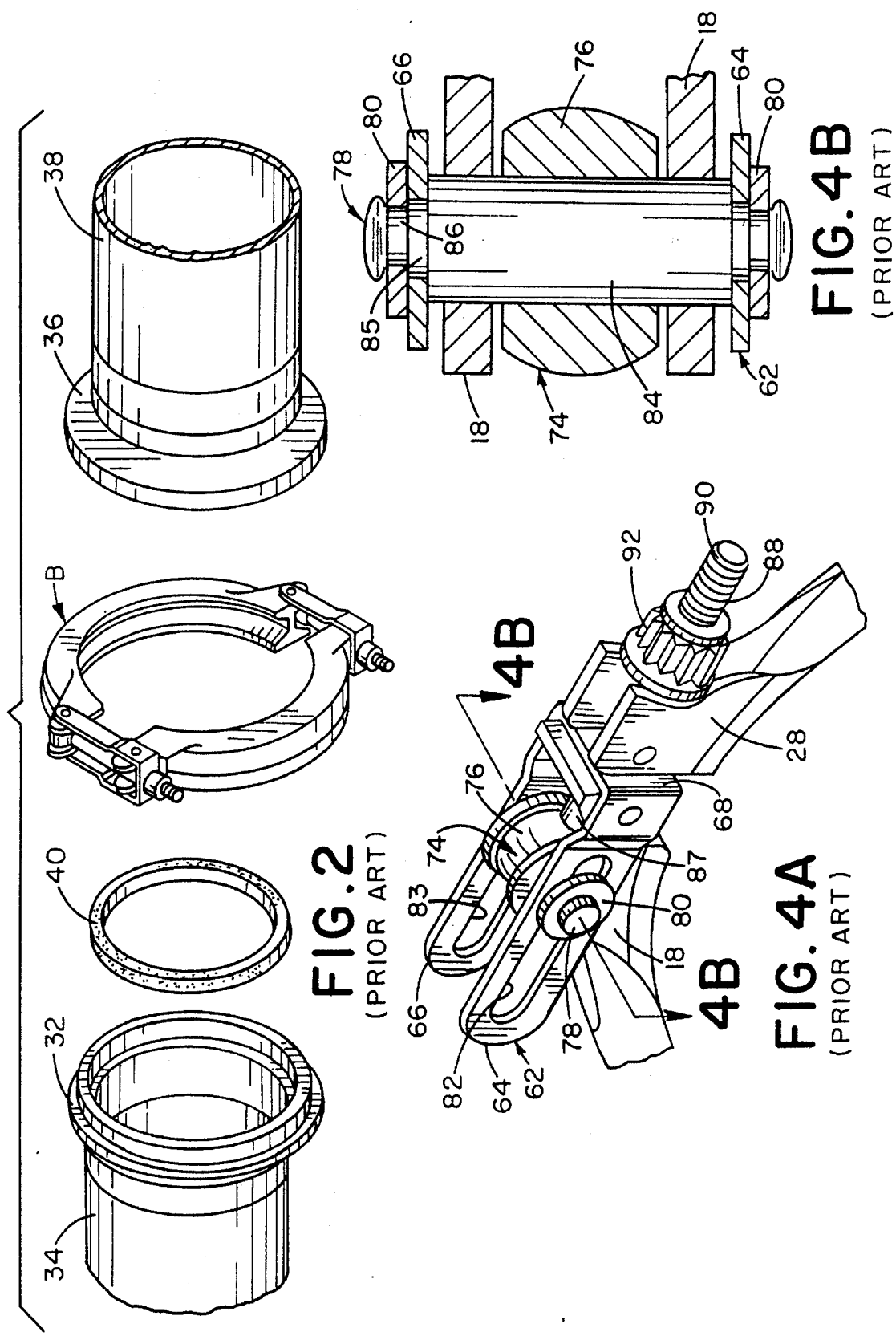
FIG. 4A is an enlarged perspective view of a latching portion of a conventional rigid V-retainer coupling assembly, along the lines of the ones illustrated in FIGS. 1 and 2, in which a trunnion lug is incorrectly fastened to the outside of a latch.
FIG. 4B is a greatly enlarged vertical cross-sectional view along line 4B—4B through an eyebolt lug end of the rigid V-retainer coupling assembly of FIG. 4A.

With reference now to FIG. 4A, the conventional safety latch assembly comprises a latch or saddle 62 having a first leg 64, a second leg 66 and a connecting base wall 68. A trunnion washer or saddle block 70 is secured as by a fastening means 72 in the latch 62 adjacent the base wall 68 thereof. An eyebolt 74 is pivotally secured to the first retainer half second end lug, or eyebolt lug, 18 such that a first end 76 of the eyebolt is fastened between a pair of legs of the lug by a crosspin 78 extending transversely through the two legs of the lug 18. A retaining washer 80 is located at each end of the pin 78. The washer serves to slidably and rotatably secure the latch 62 to the eyebolt pin 78. Each end of the pin 78 extends through a respective one of a pair of slots 82, 83 that extend longitudinally in a respective one of the first and second legs 64 and 66 of the latch 62. Washers 80 enable the latch 62 to be slidably and rotatably secured to the lug 18.

With reference now to FIG. 4B, the crosspin 78 comprises a first relatively large diameter section 84 which extends through respective aligned apertures in the eyebolt first end 76 and the pair of legs of the lug 18. The pin 78 also includes on each side a second smaller diameter section 85 which extends through a respective one of the slots 82, 83 located in the two legs 64 and 66 of the latch 62. Finally, the pin includes on each end a third, even smaller diameter, section 86 which extends through an aperture in the middle of each of the retaining washers 80. It is evident that an enlarged diameter section is provided at each end of the crosspin in order to hold the washers 80 in place. In other words, the pin is riveted at its ends and has a larger diameter in the middle than at its riveted ends. The different diameter sections are necessary in order to assure that the latch 62, i.e. the legs 64 and 66, is able to slide in relation to the pin 78 while the pin allows a pivoting motion of the eyebolt 74.

The eyebolt 74 further comprises a shaft 87 which extends through a suitably sized aperture (not visible) in the trunnion washer 70 and through a suitably sized aperture (not visible) in the base wall 68. The eyebolt 74 terminates in a second end 88 that is threaded as at 90. A nut 92, such as a self-locking nut, can be selectively fastened to the threaded end 90 of the eyebolt 74.

Such conventional safety latches were originally designed to keep the coupling and joints from separating if the coupling eyebolt should break. However, if the coupling is incorrectly installed with the trunnion lug 28 being located outside the safety latch 62, the ducting joint integrity is in jeopardy if the bolt fails. If the coupling is improperly installed, there is the possibility of the eyebolt 74 and the lock nut 92 jumping out of the trunnion lug 28 in the event of vibration. This can result in complete separation of the joint with possibly disastrous consequences.

Incorrect installation can occur when the installer fails to bring the latch 62 over the trunnion lug 28 so that the trunnion lug is located within the latch and adjacent the trunnion washer 70. Instead, if the eyebolt 74 is long enough, and the latch 62 is slid far enough in relation to it, it is possible to place the trunnion lug 28 outside of the latch 62 such that the eyebolt 74 extends between the legs of the trunnion lug 28. Thereafter, the nut 92 can be threaded into place on the eyebolt threaded end 90 so that the trunnion lug 28 bears on the outside of the latch 62. To the inexperienced installer, it would appear as if the coupling were correctly fastened, but such an installation can have disastrous consequences should the system undergo vibration and the bolt 74 jump out from between the legs of the trunnion lug 28.

Figure 5:
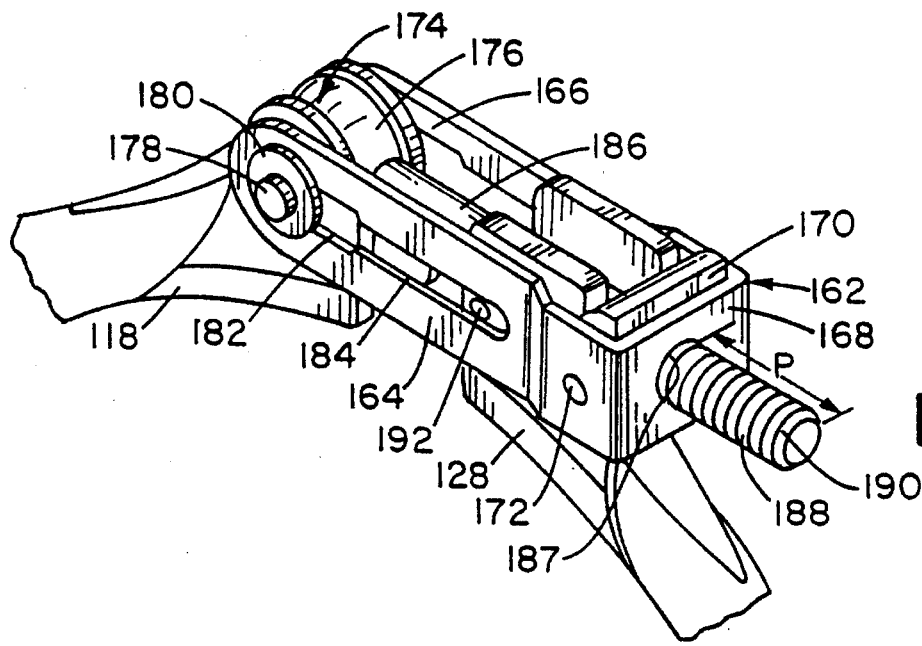
FIG. 5 is a perspective view illustrating a first embodiment of a means for preventing an incorrect installation of a trunnion lug in relation to a latch according to the present invention; and, FIG. 6 is a perspective view illustrating a second embodiment of a means for preventing an incorrect installation of a trunnion lug in relation to a latch according to the present invention.

According to the present invention, a means is provided for preventing an incorrect installation of the trunnion lug in relation to the latch and the eyebolt of a flexible or rigid V-retainer coupling assembly. FIG. 5 illustrates one embodiment of such a means. In FIG. 5, the means comprises a latch 162 that includes a first leg 164, a second leg 166 and a base wall 168 joining the two legs. A trunnion washer 170 is secured in the latch adjacent the end wall 168 by fastening means 172. An eyebolt 174 is pivotally secured to a first end lug 118 by means of a crosspin 178 extending through a first end 176 of the eyebolt 174. A washer 180 is located adjacent each end of the pin 178. One of these extends over a first longitudinally extending slot 182 in the leg 164. That slot 182 is of a first width and communicates with a second longitudinally extending slot 184 of a second, and smaller, width. Thus, a stepped slot design is disclosed. A shaft 186 of the eyebolt 174 extends through a suitably sized aperture (not visible) in the trunnion washer 170 and a suitably sized aperture 187 in the base wall 168. A second end 188 of the eyebolt 174 terminates in a threaded portion 190.

In this embodiment, an incorrect installation of the trunnion lug 128 in relation to the safety latch 162 is prevented since the safety latch 162 cannot be slid manually very far in relation to the eyebolt lug threaded end 190. The latch 162 can be slid only as far as the larger width slot 182 therein extends. Further manual sliding of the latch in relation to the eyebolt lug 118 is prevented since the diameter of the narrower width slot 184 is too narrow to allow the pin 178 to enter the slot 184. This, coupled with the a predetermined length of the eyebolt 174, prevents any attempted manual engagement of a nut (not illustrated in FIG. 5 but identical to the nut 92 in FIG. 4) on the threaded end 190 of the eyebolt 174 should one seek to place the trunnion lug 128 outside of the latch 162 with the legs of the lug 128 projecting around the second end 188 of the eyebolt 174.

Figure 3:
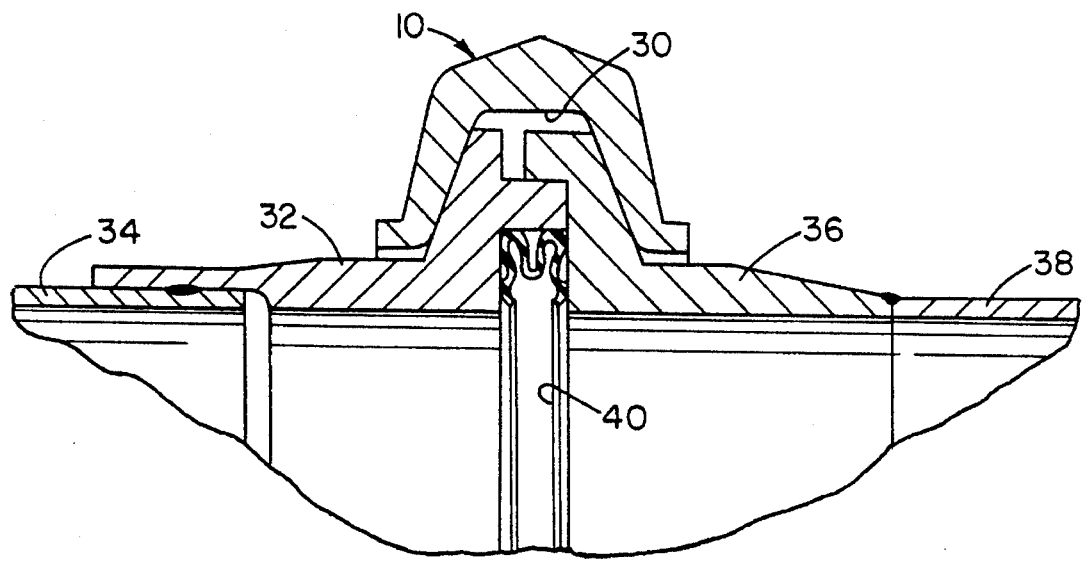
FIG. 3 is a greatly enlarged cross sectional view through a joint, such as the one illustrated in FIG. 2, in an assembled condition.

One of the problems with the sizing of latches in rigid V-retainer couplings is that the latch and lug area of the coupling sees the accumulation of all the tolerances in both the flange pair of the conduits which are being coupled, as well as the coupling assembly itself. Therefore, the length of the latch 60 needs to be long enough for a maximum material condition pair of flanges. This insures that the coupling can be latched over a maximum material condition flange pair when a seal (such as the seal 40 in FIG. 3) is present and when there is a slight angular misalignment as well. On the other hand, the lugs 118 and 128 of the coupling need to be far enough apart that in case of a minimum material condition flange pair gauging, when the coupling is tightened to its full nominal torque rating, the lug end faces do not bottom out (i.e. contact each other) before the full axial preload is developed on the coupling.

Because of the foregoing two considerations, it is necessary that the crosspin 178 be able to slide in the narrow diameter portion 184 of the slot of FIG. 5 when a tool is employed to tighten the nut (92 in FIG. 4A) on the threaded shaft 188 of the bolt 174. To this end, the diameter of the first or wider slot portion 182 is approximately 0.160 inches, the diameter of the pin section which slides in the slot (see 85 in FIG. 4B) is approximately 0.150 inches and the diameter of the narrowed slot portion 184 is 0.140 inches. In this way, the narrowed portion 184 of the slot is slightly undersized to prevent a manual, or hand pushed movement, of the latch eyebolt pin 178 into the narrowed area 184.

However, with wrench tightening, the crosspin 178 will travel into the narrowed area 184 of the latch with no damage to either the pin or to the latch 162 since the narrowed area 184 has a diameter approximately 0.010 inch less than the diameter of the pin. In other words, the two width slot design 182, 184 creates an interference fit with regard to the crosspin 178 such that a human without tools cannot push the pin into the narrowed slot section 184. However, the pin 178 can be forced into the narrowed slot portion 184 when a tool, such as a conventional wrench (not illustrated) is employed. The sizing of the elements disclosed above prevents harm to the crosspin 178 and the retaining washers (see 80 in FIG. 4B) from overtorquing. The feature also prevents harm to the latch 162 from overtorquing. The crosspin 178 will travel into the narrowed slot section 184 of the latch when at least approximately 150 to 200 lbs. of force is exerted. Such force can generally be exerted only with a tool.

It will be a rare event that the crosspin 178 will need to slide into the narrowed slot section 184. This should occur only if there is an over-torque of the nut (92 in FIG. 4A) or if the flange pair (32 and 36 in FIG. 3) is undersized.

With continued reference to FIG. 5, it should be appreciated that the narrower width slot 184 is also necessary in order to allow the requisite sliding of the trunnion lug 128 in relation to the latch as the V-retainer coupling assembly is tightened around a flanged joint. To this end, the trunnion lug 128 is provided with a slight outwardly extending bump 192 which fits in the narrower width slot 184. The slot 184 cooperates with the bumps 192 in order to hold the trunnion lug in place in the latch 162. This maintains the lugs 118 and 128 in an assembled relationship before the coupling assembly is tightened around a flanged joint. In addition, the slot 184 cooperates with the bumps 192 in order to allow a smooth, guided, sliding motion of the trunnion lug 128 in relation to the latch 162 as a nut is tightened onto the threaded end 190 of the eyebolt 174.

It should be appreciated that in order to prevent an incorrect installation of the trunnion lug, it is important that the length of the eyebolt be limited to just the eyebolt protrusion P necessary for securing a suitable nut to the threaded end of the eyebolt 174 when the trunnion lug 128 is correctly located within the safety latch 162. If the length of the eyebolt 174 were increased sufficiently, then the protrusion P would be long enough that a nut could be secured onto the threaded end 190 of the eyebolt even if the trunnion lug 128 were incorrectly located despite the limited amount of manual sliding movement which is allowed to the latch 162. Therefore, it requires the cooperation between the limited manual sliding movement of the latch 162 and the controlled protruding length P of the eyebolt 174 in order to insure that the means for preventing an incorrect installation of the trunnion lug in relation to the latch and the eyebolt function correctly. However, by increasing the length of the trunnion lug 128, then one can provide a longer length eyebolt 174 as well as a longer length slot section 182 without allowing for an incorrect installation of the trunnion lug in relation to the latch and the eyebolt.

Figure 6:
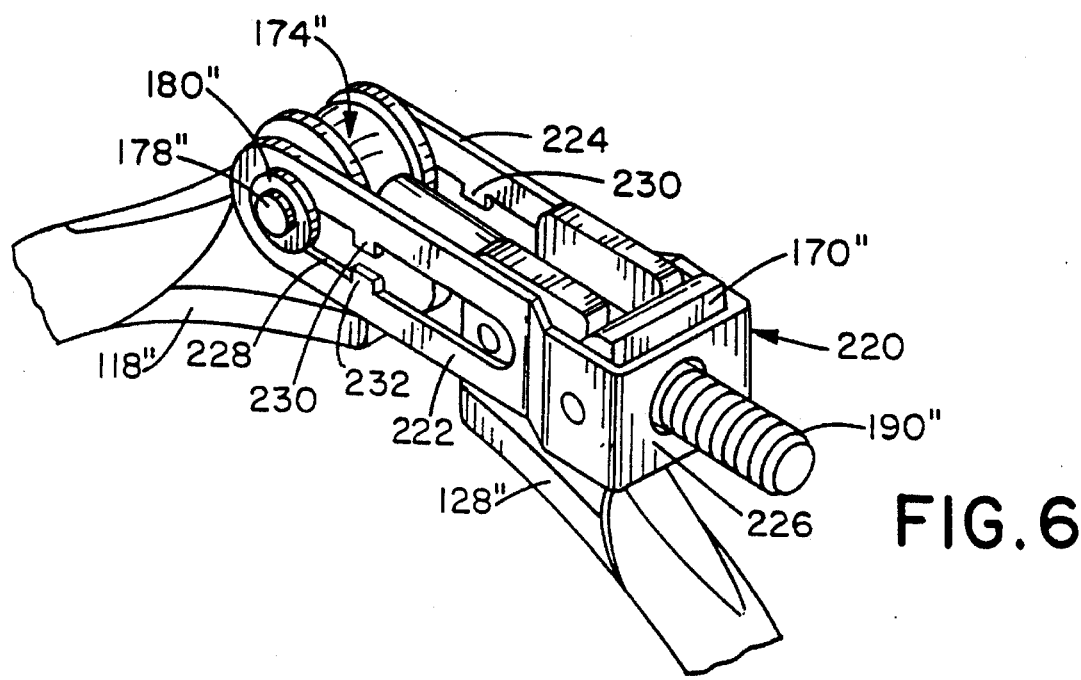

With reference now to FIG. 6, another embodiment of a means for preventing an incorrect installation of a trunnion lug end of a coupling element in relation to a latch and eyebolt is provided. For ease of appreciation and understanding of this embodiment of the invention, like components are identified by like numerals with a double primed suffix (") and new components are identified by new numerals.

In this embodiment of the invention, a latch 220 includes a first leg 222 and a second leg 224 as well as a base wall 226. A single width slot 228 is provided in each leg 222 and 224. A first tab 230 extends inwardly into each slot 228. The first tab is shown as being located adjacent to an upper edge of the slot 228. The tab retards a sliding of the latch 220 on an eyebolt pin 178" upon a manual exertion far enough in relation to an eyebolt lug 118" so as to allow an incorrect installation of a trunnion lug 128" around a threaded end 190" of an eyebolt 174" once a suitable length for the eyebolt 174" is chosen.

It should be appreciated from FIG. 6 that two such tabs or protrusions 230 are illustrated, one extending inwardly into each slot 228 on each of the legs 222, 224. The tabs are so sized as to retard a sliding movement of the tabbed area of the latch past an eyebolt crosspin 178" upon a manual exertion. FIG. 6 further illustrates that, if desired, a second set of tabs 232 can be provided adjacent a lower edge of the slots 228. These tabs would be so sized as to cooperate with the pair of upper tabs 230 to retard a manual sliding motion of the crosspin 178" past a preselected point in relation to the latch 220. Obviously, therefore, either four smaller tabs 230, 232 can be provided or two larger tabs 230.

In order to push the crosspin 178" past these tabs or protrusions, the installer would need a conventional wrench or similar type of conventional tool. Once the crosspin 178" has slid past the protrusion, however, it can slide freely in the latch slot 228 to its other end. In order to remove the coupling from around a pair of flanges of adjacent duct sections, the latch crosspin needs to be pulled back over the tab or protrusion of the latch 220. This would again need to be done with the use of a tool.

The invention has been described with reference to several preferred embodiments. Obviously, modifications and alterations will occur to others upon the reading and understanding of this specification. It is intended to include all such modifications and alterations insofar as they come within the scope of the appended claims or the equivalents thereof.

We claim:

1. A coupling assembly comprising:

a first coupling element having a first end and a second end;

a second coupling element having a first end and a second end;

a first means for securing said first end of said first coupling element to said first end of said second coupling element; and, a second means for securing said second end of said first coupling element to said second end of said second coupling element, wherein said second means comprises:

an eyebolt pivotally mounted by a pin on said first coupling element second end, a latch pivotally and slidably mounted on said first coupling element second end, said latch including a longitudinally extending slot through which an end of said pin protrudes;

a nut selectively threadable onto a threaded end of said eyebolt, and a means for preventing said second end of said second coupling element from being secured outside said latch, wherein said means for preventing comprises a reduced width portion of said slot located on said latch, said reduced width slot portion preventing said latch from sliding far enough in relation to said eyebolt to allow for said second end of said second coupling element to be secured outside said latch.

2. The coupling assembly of claim 1 wherein said reduced width slot portion has an interference fit with said pin mounting said eyebolt such that said pin can not be pushed into said reduced width slot portion manually but can be pushed into said reduced width slot portion when using a tool.

3. The coupling assembly of claim 1 wherein said longitudinally extending slot portion has a diameter of approximately 0.160 inches, said reduced width slot portion has a diameter of approximately 0.140 inches and said pin has a diameter of approximately 0.150 inches thereby providing an interference fit between said pin and said reduced width slot portion.

4. The coupling assembly of claim 1 wherein said reduced width slot portion extends from one end of said slot towards another end thereof.

5. The coupling assembly of claim 1 wherein said reduced width slot portion extends for a limited distance along said slot between first and second ends of said slot.

6. The assembly of claim 1 wherein said first means for securing comprises a hinge link.

7. The retainer of claim 1 wherein said first means for securing comprises:
   a latch pivotally and slidably secured to said second end of said first coupling element,
   an eyebolt pivotally secured to said first coupling element second end,
   a nut selectively threadable onto a threaded end of said eyebolt, and
   a means for preventing an incorrect installation of said second end of said second coupling element in relation to said latch and said eyebolt.

8. A circumferentially contractible rigid V-retainer coupling assembly for securing a pair of flanged ducts together, comprising:
   a first coupling element having substantially V-shaped cross-section, a first end comprising a first lug and a second end comprising a second lug;
   a second coupling element having a substantially V-shaped cross section, a first end comprising a first lug and a second end comprising a second lug;
   a first means for securing said first lug of said first coupling element to said first lug of said second coupling element; and,
   a second means for securing said second lug of said first coupling element to said second lug of said second coupling element, wherein said second means comprises:
      an eyebolt pivotally secured to said first coupling element second lug by a pivot pin, said eyebolt extending through an aperture in said latch base,
      a U-shaped latch including spaced first and second legs and a base wall connecting said legs, each of said legs having a longitudinally extending slot, respective ends of said pivot pin extending through a respective one of said slots so that said latch is pivotally and slidably secured to said second lug of said first coupling element,
      a nut selectively threadable onto a threaded end of said eyebolt, and
      a means for preventing said second lug of said second coupling element from being secured outside said latch, wherein said means for preventing incorrect installation comprises a reduced width slot portion located on at least one leg of said latch, said reduced width slot portion cooperating with a controlled length of said eyebolt to prevent said latch from sliding enough in relation to said eyebolt pivot pin to allow for an incorrect installation to occur.

9. The retainer of claim 8 wherein said reduced width slot portion has an interference fit with said pin mounting said eyebolt such that said pin can not be pushed into said reduced width slot portion manually but can be pushed into said reduced width slot portion when using a tool.

10. The retainer of claim 8 wherein said longitudinally extending slot portion has a diameter of approximately 0.160 inches, said reduced width slot portion has a diameter of approximately 0.140 inches and said pin has a diameter of approximately 0.150 inches thereby providing an interference fit between said pin and said reduced width slot portion.

11. The retainer of claim 8 wherein said reduced width slot portion extends from one end of said slot towards another end thereof.

12. The retainer of claim 8 wherein said reduced width slot portion extends for a limited distance along said slot between first and second ends of said slot.

13. The retainer of claim 8 wherein said first means for securing comprises a hinge link.

14. The retainer of claim 8 wherein said first means for securing comprises:
   a latch pivotally and slidably secured to said second lug of said first coupling element,
   an eyebolt pivotally secured to said first coupling element second lug,
   a nut selectively threadable onto a threaded end of said eyebolt, and
   a means for preventing an incorrect installation of said second end of said second coupling element in relation to said latch and said eyebolt.

15. A circumferentially contractible clamp comprising:
   a band adapted to encircle the object to be clamped;
   first and second ends defined upon said band;
   a pivot pin pivotally mounted on said first end;
   an eyebolt pivotally mounted on said pivot pin;
   a latch slidably and pivotally mounted on said pivot pin;
   a nut selectively threadable onto a threaded end of said eyebolt; and,
   a means for preventing an incorrect installation of said second end of said band in relation to said latch, wherein said latch includes a longitudinally extending slot and said means for preventing comprises a reduced width portion of said slot, said reduced width slot portion preventing said latch from sliding far enough in relation to said pivot pin to allow for said band second end to be secured outside said latch.

16. The clamp of claim 15 wherein said reduced width slot portion has an interference fit with said pin mounting said eyebolt such that said pin can not be pushed into said reduced width slot portion manually but can be pushed into said reduced width slot portion when using a tool.

17. The clamp of claim 15 wherein said longitudinally extending slot portion has a diameter of approximately 0.160 inches, said reduced width slot portion has a diameter of approximately 0.140 inches and said pin has a diameter of approximately 0.150 inches thereby providing an interference fit between said pin and said reduced width slot portion.

18. The clamp of claim 15 wherein said reduced width slot portion extends from one end of said slot towards another end thereof.

19. The clamp of claim 15 wherein said reduced width slot portion extends for a limited distance along said slot between first and second ends of said slot.

20. A method for preventing an incorrect installation of a circumferentially contractible clamp comprising:

providing a band adapted to encircle an object to be clamped, the band comprising first and second ends, a pivot pin pivotally mounted on the first end, an eyebolt pivotally mounted on the pivot pin, and a latch slidably and pivotally mounted on the pivot pin wherein the pivot pin is slidably mounted in a slot of the latch and wherein a nut is selectively threadable onto a threaded end of the eyebolt;

limiting a sliding motion of the latch in relation to the pivot pin when manually installing said latch by providing a narrowed portion of the latch slot; and, preventing the second end of the band from being secured outside the latch.

21. The method of claim 20 further comprising the step of preventing a threading of the nut onto the threaded end of the eyebolt when the band second end is located outside the latch.

22. The method of claim 20 wherein said step of preventing comprises the subsidiary step of controlling the length of the eyebolt.

* * * * *